INPUT-OUTPUT BUFFER SYSTEM
Filed Nov. 23, 1964
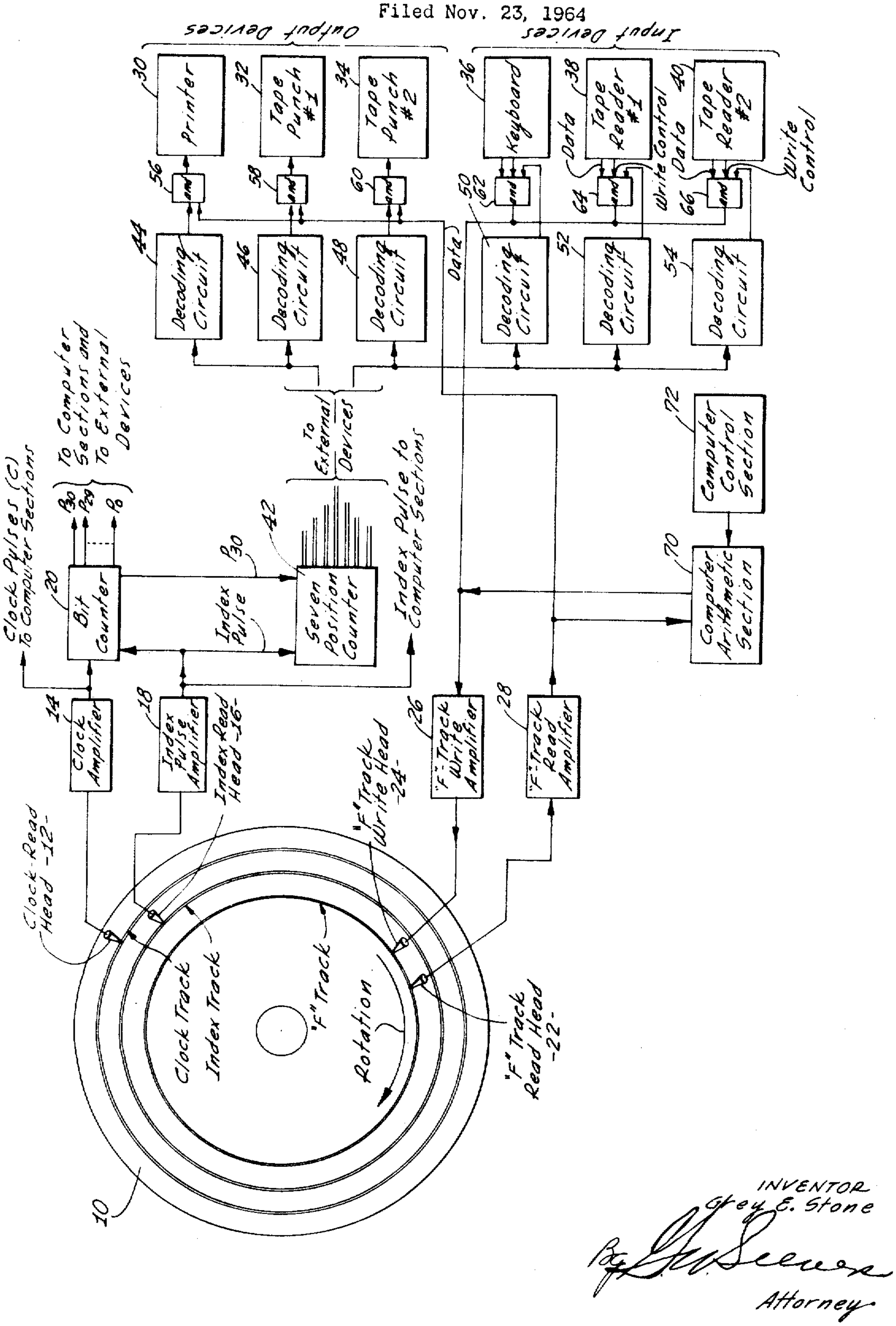
INVENTOR
Grey E. Stone
By [signature]
Attorney United States Patent Office 3,351,914
Patented Nov. 7, 1967

3,351,914
INPUT-OUTPUT BUFFER SYSTEM

Grey E. Stone, Covina, Calif., assignor to General Precision, Inc., a corporation of Delaware
Filed Nov. 23, 1964, Ser. No. 413,202
7 Claims. (Cl. 340—172.5)

ABSTRACT OF THE DISCLOSURE

An input-output buffer system is described herein which is intended to provide an indirect communication link between an associated computer and the usual external devices used in conjunction with the computer. The buffer may include a multi-sectored track on the main memory of the computer, and logic circuitry and other components are provided so that the different sectors on the buffer track may be effectively connected to the different external devices successively and repeatedly. In this way, each of the external devices in effect, has one or more sectors in the buffer allocated expressly to it.

The present invention relates to electronic, general purpose, digital computers, and it relates more particularly to an improved input/output system for use in such computers.

The input/output system to be described provides a buffered indirect communication link between the computer and peripheral external devices. This communication may be carried out by way of the main memory of the computer. A special buffer track (F Register) is provided in the main memory for the purpose. Data to be transmitted to or from the computer is written in prescribed sectors in the buffer track, from where it is read for use by the computer or by the external devices.

The input/output system of the invention is particularly advantageous in that it provides virtually unlimited communication versatility between the computer and the extraneous input and output devices. A large number of different input and output units can be associated with the computer, and communication can be established (as will be described) between the computer and each of the units, in a simple manner and by means of simple circuitry.

The input/out system of the invention permits the general purpose computer in which it is incorporated to be extremely flexible and capable of use in a wide variety of different applications. This versatility permits the computer to be adapted to a wide variety of different applications without modification of the basic unit and without the requirement of complex coupling equipment between the computer and the external units associated therewith.

A feature of the embodiment of the input/output system of the invention to be described is that information can be transferred to or from a wide variety of external devices by the computer without interfering with the normal operation of the computer.

A further feature of the input/output system of the invention, in the embodiment to be described, is the incorporation of independent read and write heads in the aforesaid buffer register track to permit data to be updated in the buffer register without interfering with the normal read operations thereof.

Another feature of the invention is the provision of means within the computer for permitting the aforesaid buffer register to be used directly as a source of operands for the computer, or for transmitting results from the computer to that register.

The above and other features of the invention which are believed to be new are set forth in the claims appearing at the end of this specification. Other advantages of the invention will become evident from a consideration of the following description, when the description is taken in conjunction with the accompanying drawing, in which the single figure is a block diagram of a system constituting one embodiment of the invention and incorporating the concepts of the invention.

The electronic general purpose digital computer with which the system of the invention, to be described, is associated, incorporates a magnetic disc-type memory. Data to be transferred to or from the computer is written in prescribed sector locations on a buffer track on that memory, referred to heretofore as the "F" register track. The data may be read from the sectors of the buffer track for use by the computer or associated output devices.

As will be discussed, the F Register buffer track in the particular embodiment under consideration is divided into 128 addressable sectors. It is to be understood, of course, that more or less sectors may be used, depending upon the particular application to which the computer is to be put.

As also noted above, the F Register buffer track has independent read and write heads associated therewith. This is in order that the data in the sectors of the buffer track may be updated continuously, without affecting the reading operations.

The read and write heads mentioned in the preceding paragraph may be spaced along the F Register buffer track by one word time, for example. The write head, of course, is located "upstream" from the read head. In a constructed embodiment of the invention, and with the aforesaid read and write heads spaced apart by one word time, data written in any particular sector of the F Register buffer track is available at the read head 78.1 microseconds later; and it is also available thereafter once for each revolution of the disc, that is, at 10 millisecond intervals in the particular embodiment.

When other head spacings are used for the read and write heads associated with the F track register, data written in any particular sector of the F Register buffer track is available at the read head a proportionate time later; and it is available thereafter once for each revolution of the disc.

Since there are 128 sectors available in the F track of the particular embodiment under consideration ,up to 128 independent words, or categories of information, can be handled by the system. As mentioned above, one or more specific sectors on the buffer track are assigned for each specific input or output device, so that data pertaining to any selected one of the input or output devices can be retrieved merely by reading the sectors assigned to that particular device.

Insofar as the computer itself is concerned, the sectors on the F Register buffer track can be addressed for storage or retrieval of information in exactly the same manner as the main memory tracks and sectors are addressed. For example, the operation may be controlled by the operand sector field of the appropriate instruction word.

It will be assumed that the computer includes, for example, four arithmetic registers. Then, the contents of any particular one of the four registers can be stored in the aforesaid F Register buffer track in response to a "store on F" instruction, for example. This instruction will specify which of the four arithmetic registers is to have its contents stored on the F Register buffer track; and the operand sector field of the instruction will also designate which sector in the F Register buffer track is to receive the information.

Likewise, information can be selected by the computer from any sector in the F Register buffer track and applied to a selected register in the arithmetic section.

This may be achieved by any arithmetic instruction, for example, specifying that the operand is to be selected from a given sector on the F Register buffer track, or in the same manner by any other instruction directing the loading of an arithmetic register. In brief, and as mentioned above, these latter instructions treat the F Register buffer track in the same manner as any other portion of the main memory.

For the external input and output units, and as will be described, a separate sector locating system is used. In the constructed embodiment, for example, a seven-stage counting circuit, synchronized by the computer index pulse and stepped at one word intervals, furnishes coded location data to all the external input and output units. This is accomplished by way of an address bus bar consisting of seven pairs of wires.

The address data is decoded at each external device to indicate when the sector or sectors associated with any specific one of the external devices are positioned for a rear or write operation. Of course, this counting circuit may be replaced by counting circuits of more or less counting stages, depending upon the particular application to which the system is to be placed.

A common read bus bar from the F Register buffer track is routed to all appropriate external output devices. Information is transmitted over that bus bar continuously, and it is gated to the individual output devices when the decoded address data indicates that the sector assigned to that particular device is being read.

A common write bus bar, including a write control line, is connected between all the appropriate external input devices and the computer. Data to be transmitted to the F Register buffer track is placed on the data write bus bar by any particular one of the input devices when the decoded address data indicates that the appropriate sector on the F Register buffer track is in position to receive the data.

The write control line is included in the bus system to give each external input device the option of writing information, or not, as its particular sector becomes available.

Appropriate timing signals, defining bit positions within each computer word, are also furnished by the computer to the external devices. These signals, in conjunction with the sector address signals, provide absolute synchronization between the computer and the external devices.

As shown in the accompanying drawing, the main memory of the computer may take the form of a rotatable magnetic disc 10. This form of memory provides maximum memory capacity at minimum cost and with minimum volume. The memory disc may be rotated by any suitable known type of drive mechanism (not shown). The memory disc 10 may be so driven at a rate, for example, of 6000 revolutions per minute. This results in a single revolution time of 10 milliseconds.

The main memory capacity in a constructed embodiment of the invention was over 4,000 thirty-bit computer words. The computer words are stored on the memory disc 10 in thirty-two concentric circular tracks (not shown). These tracks make up the main memory, and each is divided, for example, into 128 sectors. Each sector, in turn, contains 31 bit positions so as to accommodate the thirty-bit words and associated spacer bits.

The memory disc 10 also includes two timing tracks, designated in the drawing as the clock track and the index track. The clock track includes an associated clock read head 12 and clock amplifier 14. The index track includes an associated index read head 16 and index pulse amplifier 18.

The clock track, for example, includes a series of equally spaced unity bits which extend around the entire track. The aforesaid constructed embodiment of the invention uses 3,968 clock bits in the clock track. The clock pulses produced by the clock amplifier are used to synchronize all the operations of the computer in usual manner. The fundamental clock frequency, of course, is a function of the speed of the disc 10. When the disc is rotated at 6,000 r.p.m., for example, the clock frequency in the constructed embodiment of the invention is approximately 400 kilocycles.

The index track includes a single unity bit. This bit serves as an origin bit to identify the starting point of each revolution of the disc 10. All timing circuitry in the computer is synchronized by the index pulses from the amplifier 18.

A bit counter 20 is coupled to the clock amplifier 14 and to the index pulse amplifier 18. The bit counter may be any usual binary counter, and it is used to define the thirty-one bit positions within each sector of the disc 10. A new word position is defined each time the bit counter 20 recycles. The outputs P0–P30 of the counter 20 identify the individual bit positions within each word in the various sectors. The thirty-first bit position (P30) output identifies the space between the successive words in the tracks on the disc 10.

The outputs from the bit counter 20 are used in usual manner in the computer section. These outputs are also supplied to the external devices, so that absolute synchronism between the operation of these devices and the operation of the computer may be realized.

As part of the computer input/output system, one special track on the disc, designated as mentioned above as the "F" Register buffer track is used. This track is set aside for storing input and output information. The F Register buffer track, for example, may be constructed to store 128 thirty-bit binary words, in the corresponding number of sectors extending around that track.

The F Register buffer track, as shown in the drawing, includes a read head 22 and a write head 24. These heads may be mounted to be spaced, for example, an amount corresponding to one word time, as mentioned above. A write amplifier 26 is coupled to the write head 24; and the read head 22 is coupled to a read amplifier 28.

As mentioned above, both the arithmetic section of the computer, and the external devices associated with the computer have access to the F track read and write heads through the respective amplifiers 26 and 28. The memory disc 10 acts as a buffering element between the external devices and the arithmetic section of the computer.

Information to be transferred into or out of the computer through the input/output system of the invention is first written on the F track at a word location assigned to that specific piece of data. The information is available to be read by the F track read head one word time later, and then once for each subsequent revolution of the memory disc. The 128 word positions in the F track, for example, may be allocated either as input storage or output storage in any desired ratio to fit any particular application.

In the particular embodiment of the invention shown in the drawing, it is assumed that three output devices, for example, a printer 30, a first tape punch 32, and a second tape punch 34 are used; and three input devices, such as, for example, a usual manual keyboard 36, a first tape reader 38 and a second tape reader 40 are used. It will be understood, of course, that the system is adaptable to more or less input devices and output devices in any desired ratio.

In order to reach the external devices 30, 32, 34, 36, 38 and 40, a seven-position counter 42 is provided. This counter responds to the index pulses from the amplifier 18, and to the P30 pulse from the bit counter 20, to change state at the end of each word time, during the rotation of the disc 10. The counter 42 undergoes 128 distinct states, corresponding to 128 successive word times, for example, and then recycles.

The external devices 30, 32, 34, 36, 38 and 40 include respective decoding circuits designated 44, 46, 48, 50, 52 and 54, respectively. Seven pairs of leads, for example, in an appropriate bus bar, couple the counter 42 to the decoding circuits. The decoding circuits are constructed in known manner, to incorporate known logic circuitry, so that each decoding circuit produces an output in response to a different pattern of binary signals applied to it on the seven pairs of leads from the counter 42.

A plurality of "and" gates 56, 58 and 60 couple the decoding circuits 44, 46 and 48 to respective ones of the output devices 30, 32 and 34. The data from the read amplifier 28 is also supplied to the "and" gates 56, 58 and 60.

As the seven-position counter 42 changes from state to state, the decoding circuit 44 enables the gate 56 when the counter is in a particular state, the decoding circuit 46 enables the gate 58 when the counter is in a further particular state, and the decoding circuit 48 enables the gate 60 when the counter is in yet a further state.

The control of the counter 42 by the index pulses and the bit counter 20 is synchronized with the memory disc 10, so that the decoding circuit 44 causes data to flow to the printer 30 when the read head 22 scans a particular sector in the F track. Likewise, the decoding circuit 46 causes data to be supplied to the first tape punch 32 when the read head 22 senses a further selected sector. In like manner, the decoding circuit 48 permits data to flow to the second tape punch 34, when the read head 22 senses yet another selected sector.

In the manner described, a particular sector in the F track is allocated to the printer 30, another particular sector is allocated to the tape punch 32, and yet another particular sector is allocated to the tape punch 34. In the particular embodiment, and since the seven-position counter 42 cyclically repeats its count once during the course of one revolution of the disc 10, it is possible for a plurality of sectors to be sensed by the read head 22 during each revolution of the disc, and to have their contents applied respectively to the different output devices allocated thereto.

In like manner, the input devices 36, 38 and 40 are coupled to respective "and" gates 62, 64 and 66. The decoding circuits 50, 52 and 54 are also coupled to the respective "and" gates, so that the "and" gates are enabled by the decoding circuits in correspondence with further states of the counter 42.

Whenever one of the "and" gates 62, 64 and 66 is enabled, the timing is such that the signals from the corresponding input device are fed to a particular allocated sector, or sectors, on the F track through the write head 24. An additional write control is provided to enable the corresponding one of the "and" gates 62, 64 and 66, so that any input device may supply its signals to the computer, only when the operator establishes the appropriate control.

The write amplifier 26 and the read amplifier 28 are shown as coupled to the computer arithmetic section 70 by any appropriate circuit means, this section being under the control of the computer control section 72. By usual logic, and as described above, the arithmetic section 70 and control section 72 cooperate with one another so as to permit the appropriate instructions to cause operands to be selected from any designated sector in the F track for application to the arithmetic section, and also to permit results from the arithmetic section to be applied through the write head 24 to any selected sector in the F track.

In the manner described, therefore, appropriate instructions can place the results from the arithmetic section in selected sectors of the F track. Certain ones of these sectors may be allocated to the various output devices. Therefore, for any particular output operation, an output from the arithmetic section to a selected output device is effected by reading the result into the sector, or sectors, allocated to that output device. Immediately after the writing, the read head 22 will pick up the information and supply it to the output device. Thereafter, the same information can be read out to the output device each time the particular sector circulates under the read head 22.

By the same token, input information can be read into the arithmetic section, by actuating any input device, so that it places its signals in the sector allocated to it on the F Register buffer track. Thereafter, an appropriate computer instruction will transfer the information from the F buffer track to the computer.

For example, in a situation where sensor analog information is to be transmitted to the computer, the information can be digitized externally and written automatically through the appropriate input device to an assigned sector on the F buffer track. When the computer requires data from the particular sensor, it merely calls for the word in the corresponding sector on the F Register track. This data is assured of being current, since updating can occur one word time, or 78.1 microseconds prior to reading. No computational delay is encountered such as would be the case if the computer had to address the sensor, call for information, and then wait for a stabilized response.

Likewise, for data transmission to an external device, the computer prepares information in the serial format required by a particular device and stores the information in the sector of the F Register allocated to that device. This word is made available to the external device one word time later, as it passes the read head 22.

The system described above can be modified and changed in a simple manner so as to permit the computer to achieve a wide range of capabilities to which it is not normally able to meet. For example, by the inclusion of appropriate adder circuits and associated logic in conjunction with the read and write heads of the F track, the input/output system may be made to perform desired integrating, timing, accumulating and other operations.

The invention provides, therefore, a simple input/output system for use in conjunction with a digital computer, and for adapting the computer for convenient control in conjunction with a plurality of input and output devices, and the like.

It follows that although a particular embodiment of the invention has been described, modifications may be made. The following claims are intended to cover such modifications as fall within the scope of the invention.

What is claimed is:

1. An input/output system for a digital computer including: a memory means for storing a plurality of computer words in a corresponding plurality of memory locations; writing means coupled to said memory for successively and repeatedly scanning said memory locations to store binary signals in said memory locations corresponding to said computer words; reading means coupled to said memory for successively and repeatedly scanning said memory locations to reproduce said binary signals stored therein; at least one input device; at least one output device; first control circuitry coupling said input device to said writing means; second control circuitry coupling said reading means to said output device; and timing circuit means coupled to said first and second control circuitry for successively and selectively completing a path from said reading means to said output device when said reading means successively and repeatedly scans predetermined ones of said memory locations, and for successively and selectively completing a path from said input device to said writing means when said writing means successively and repeatedly scans other predetermined ones of said memory locations, said timing circuit means including a counter synchronized with said memory means for producing distinctive control effects in said first and second control circuitry as said counter changes from state to state.

2. An input/output system for a digital computer including: a movable memory element having a track therein for storing a plurality of computer words in a corresponding plurality of sectors and having at least one timing track; a write head coupled to said track of said memory element for recording binary signals in said sectors corresponding to said computer words; a read head coupled to said track of said memory element for reproducing the binary signals recorded therein; a plurality of input devices; a plurality of output devices; first logic circuitry coupling said input devices to said write head; second logic circuitry coupling said read head to said output devices; and control circuit means coupled to said timing track of said memory element and to said first and second logic circuitry for successively and selectively completing paths to different ones of said output devices from said read head when said read head successively senses predetermined ones of said sectors, and for successively and selectively completing paths from different ones of said input devices to said write head when said write head senses other predetermined ones of said sectors.

3. An input/output system for a digital computer including: a rotatable magnetic memory disc having a first track thereon for storing a plurality of computer words in a corresponding plurality of sectors, and said memory disc having at least one timing track thereon; an electromagnetic write head magnetically coupled to said first track for recording binary signals in said sectors corresponding to such computer words; an electromagnetic read head magnetically coupled to said first track for reproducing the binary signals recorded therein; a plurality of input devices; a plurality of output devices; first logic circuitry coupling said input devices to said write head; second logic circuitry coupling said read head to said output devices; and control circuit means coupled to said timing track of said memory disc and to said first and second logic circuitry for successively and selectively completing paths to different ones of said output devices from said read head when said read head successively senses predetermined ones of said sectors, and for successively and selectively completing paths from different ones of said input devices to said write head when said write head successively senses other predetermined ones of said sectors.

4. The combination defined in claim 1 and which includes circuit means coupling said reading means and said writing means to the computer.

5. The combination defined in claim 3 in which said read head is spaced along said track from said write head in the direction of rotation of said disc and a distance corresponding to a selected number of word times.

6. The combination defined in claim 3 in which said first and second logic circuitry include a plurality of decoding circuits and circuit means coupling said decoding circuits to respective ones of said input and output devices, and in which said control circuit means includes a counter coupled to said decoding circuits for causing different ones of said decoding circuits to produce corresponding control effects in said circuit means as said counter changes from state to state.

7. An input/output system for a digital computer including: a rotatable magnetic memory disc having a track thereon for storing a plurality of computer words in a corresponding plurality of sectors, and said memory disc having at least one timing track thereon; an electromagnetic write head magnetically coupled to said track for recording binary signals in said sectors corresponding to such computer words; an electromagnetic read head magnetically coupled to said track for reproducing the binary signals recorded therein; circuit means coupling said read head and said write head to the computer; a plurality of input devices; a plurality of output devices; first logic circuitry coupling said input devices to said write head and including a first plurality of decoding circuits and first circuit means coupling said decoding circuits of said first plurality to respective ones of said input devices; second logic circuitry coupling said read head to said output devices and including a second plurality of decoding circuits and second circuit means coupling said decoding circuits of said second plurality to respective ones of said output devices; and control circuit means coupled to said timing track and to said first and second logic circuitry and including a counter coupled to said decoding circuits of said first and second plurality for causing different ones of said decoding circuits to produce corresponding control effects in said first circuit means and in said second circuit means as said counter changes from state to state, so as to complete paths successively and selectively to different ones of said output devices from said read head when said read head successively senses predetermined ones of said sectors, and to complete paths successively and selectively from different ones of said input devices to said write head when said write head senses other predetermined ones of said sectors.

References Cited

UNITED STATES PATENTS 2,874,371 2/1959 Foster ............ 340—174

ROBERT C. BAILEY, *Primary Examiner.*

O. E. TODD, Jr., *Assistant Examiner.*